United States Patent
Chopra et al.

(10) Patent No.: US 9,690,501 B1
(45) Date of Patent: Jun. 27, 2017

(54) METHOD AND SYSTEM FOR DETERMINING DATA PROFILES USING BLOCK-BASED METHODOLOGY

(71) Applicant: EMC Corporation, Hopkinton, MA (US)

(72) Inventors: Shelesh Chopra, Karnataka (IN); Vladimir Mandic, San Jose, CA (US); Mv Kiran Kumar, Karnataka (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 28 days.

(21) Appl. No.: 14/558,620

(22) Filed: Dec. 2, 2014

(51) Int. Cl.
*G06F 12/00* (2006.01)
*G06F 13/00* (2006.01)
(Continued)

(52) U.S. Cl.
CPC ............ *G06F 3/0619* (2013.01); *G06F 3/065* (2013.01); *G06F 3/067* (2013.01); *G06F 3/0641* (2013.01)

(58) Field of Classification Search
CPC .... G06F 3/0601; G06F 3/0614; G06F 3/0619; G06F 3/0641; G06F 3/064; G06F 3/0643; G06F 3/0644; G06F 3/0646; G06F 3/065; G06F 3/0653; G06F 3/067; G06F 3/0671–3/0689; G06F 11/00; G06F 11/1402; G06F 11/1446; G06F 11/1448; G06F 11/1453; G06F 11/1458; G06F 11/1474; G06F 11/30; G06F 11/3051; G06F 11/3055; G06F 11/3065; G06F 11/3089; G06F 11/34; G06F 11/3409;
(Continued)

(56) References Cited

U.S. PATENT DOCUMENTS

| 5,638,509 A * | 6/1997 | Dunphy | G06F 11/1458 714/20 |
| 6,842,770 B1 * | 1/2005 | Serlet | G06F 17/30067 707/E17.01 |

(Continued)

OTHER PUBLICATIONS

What is the difference between a volume manager and a filesystem?; Quora, Anonymous; Jan. 20, 2011; retrieved from https://www.quora.com/What-is-the-difference-between-a-volume-manager-and-a-filesystem on Feb. 26, 2016 (1 page).*

(Continued)

*Primary Examiner* — Daniel C Chappell
(74) *Attorney, Agent, or Firm* — Blakely, Sokoloff, Taylor & Zafman LLP

(57) ABSTRACT

Techniques for determining characteristics of data blocks being accessed in a storage system are described herein. According to one embodiment, an input/output (IO) request is received for accessing a first data block of a first file stored in a storage system. The first file is one of the files stored in the storage system and each file contains multiple data blocks. In response to the request, a block-based monitor executed in a memory by a processor accesses a set of monitoring rules to determine whether the first file should be monitored. If so, the block-based monitor captures statistics data associated with the first data block and stores the statistics data of the first data block in a statistics database maintained in a persistent storage device. The statistics database stores statistics data of the data blocks of files monitored and captured based on the set of monitoring rules.

24 Claims, 11 Drawing Sheets

(51) Int. Cl.
*G06F 13/28* (2006.01)
*G06F 3/06* (2006.01)

(58) Field of Classification Search
CPC .............. G06F 11/3433; G06F 11/3438; G06F 11/3442; G06F 11/3447; G06F 11/3452; G06F 11/3457; G06F 11/3466; G06F 11/3476; G06F 11/3485; G06F 11/349; G06F 11/3495; G06F 17/30017; G06F 17/30067; G06F 17/30144; G06F 17/30244; G06F 17/30339; G06F 17/3061; G06F 17/3074; G06F 17/30781; G06F 2003/0692; G06F 2201/00; G06F 2201/80; G06F 2201/81; G06F 2201/86; G06F 2201/865
USPC ........................................................ 711/162
See application file for complete search history.

(56) References Cited

U.S. PATENT DOCUMENTS

| | | | | |
|---|---|---|---|---|
| 8,078,918 B2* | 12/2011 | Diggs | .................. | G06F 11/008 714/42 |
| 2013/0297572 A1* | 11/2013 | Wilson | .............. | G06F 17/30156 707/692 |
| 2014/0188868 A1* | 7/2014 | Hunter | .............. | G06F 17/30091 707/736 |
| 2014/0223240 A1* | 8/2014 | Patil | .................... | G06F 11/3034 714/47.1 |
| 2014/0372378 A1* | 12/2014 | Long | .................. | G06F 11/1451 707/646 |

OTHER PUBLICATIONS

Definition of file; TechTarget; Jan. 2014; retrieved from http://searchcloudstorage.techtarget.com/feature/How-an-object-store-differs-from-file-and-block-storage on Feb. 29, 2016 (6 pages).*
Principles of Computer System Design: An Introduction; Saltzer et al; May 21, 2009; retrieved from https://books.google.com/books?id=I-NOcVMGWSUC&pg=PA88#v=onepage&q&f=false on Feb. 25, 2016; p. 88 (1 page).*
Definition of statistic; retrieved from http://dictionary.reference.com/browse/statistics on Feb. 25, 2016 (1 page).*
Definition of block; Free Online Dictionary of Computing; Sep. 29, 2004; retrieved from http://foldoc.org/block on Feb. 25, 2016 (2 pages).*
Performance analysis and tuning for a single-chip multiprocessor DSP; Kim et al; IEEE Concurrency, col. 5, iss. 1;Jan. 3, 1997;pp. 68-79 (12 pages).*
High-level macro-modeling and estimation techniques for switching activity and power consumption; Raghunathan et al; IEEE Transactions on Very Large Scale Integration (VLSI) Systems, vol. 11, iss. 4; Sep. 8, 2003; pp. 538-557 (20 pages).*

* cited by examiner

FIG. 4A

| Data Source | Time Stamp | Data Type | Blocks Changed | % of Block Changed |
|---|---|---|---|---|
| /FS1 | xxx | Filesystem | Aaa-cccc Ddd-eee | 10 |
| /FS1/HDFS1 | yyy | Directory | Dddd-eeee | 50 |
| /FS1/HDFS1/FILE1 | zzz | File | Ddddd-fffff | 75 |

FIG. 4B

| Data Source | Time Stamp | Data Type | Blocks Changed | Number of Block Change | Average number of blocks change per day |
|---|---|---|---|---|---|
| /FS1 | xxx | Filesystem | Aaa-cccc Ddd-eee | 100 | 10 |
| /FS1/HDFS1 | yyy | Directory | Dddd-eeee | 5000 | 500 |
| /FS1/HDFS1/FILE1 | zzz | File | Ddddd-fffff | 88000 | 8000 |

| Data Source | Time Stamp | Data Type | Blocks Changed | Average % of Block change (weekly) | Dataset Activity |
|---|---|---|---|---|---|
| /FS1 | XXX | Filesystem | Aaa-cccc Ddd-eee | 10% | Low |
| /FS1/HDFS1 | YYY | Directory | Dddd-eeee | 75% | High |
| /FS1/HDFS1/FILE1 | ZZZ | File | Ddddd-fffff | 25% | Medium |
| /FS1/HDFS7 | AAA | Directory | xxxxx-yyyyy | 0% | Dormant |

FIG. 4C

METHOD AND SYSTEM FOR DETERMINING DATA PROFILES USING BLOCK-BASED METHODOLOGY

FIELD OF THE INVENTION

Embodiments of the present invention relate generally to data storage systems. More particularly, embodiments of the invention relate to profiling data of a storage system at a data block level.

BACKGROUND

Backup challenges are becoming more and more complex in these days and due to which the SLA (software level agreement) are become even more and more demanding. There is always a persistent push to reduce the backup window, making it intelligent using technology advancements. We have seen the evolution of backups to smart and advanced backups—the introduction of snapshots, deduplication, etc. Backup software has inbuilt intelligence, the layer in between has intelligence, the target devices has become far more advanced all to make backup faster, better and efficient. However, still there are certain situations that depend upon application hosts to be intelligent to gain out of the real potential.

Most of the trend and analytics are not custom made to provide such granularity which can help providing valuable insight. Even the ones currently available are not too granular. For example, most analytics can provide details at a file system level but not as granular as block level. Having the information available at such high level can impact the decision making as there is fair bit of assumption involved. If this information is required for specific solutions like backups and storage capacity or pay-as-use etc., the profile of a data set is needed.

BRIEF DESCRIPTION OF THE DRAWINGS

Embodiments of the invention are illustrated by way of example and not limitation in the figures of the accompanying drawings in which like references indicate similar elements.

FIGS. 4A-4C are block diagrams illustrating an example of statistics data captured at a block level according to certain embodiments of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a block-based monitor or monitoring logic is utilized at a storage system to monitor data blocks of storage resources (e.g., files, directories, file system) being accessed at the storage system, capture statistics data of the data blocks at a block level, and store the captured statistics data in a statistics database maintained by a persistent storage device. The stored statistics data of data blocks stored in the statistics database can be analyzed, for example, by an analysis module or profiling engine, subsequently to derive or develop a trend of data accessing patterns of the data blocks at a block level. With block-based monitoring mechanism, more granular details about the data is available. The input and output (IO) requests can be tracked in real time. This can help reducing TCO and also adding predictability to forecast. The block-based monitoring and tracking can be implemented as a stand-alone system or as part of a storage software, such as a backup engine of a storage system.

Figure 1:
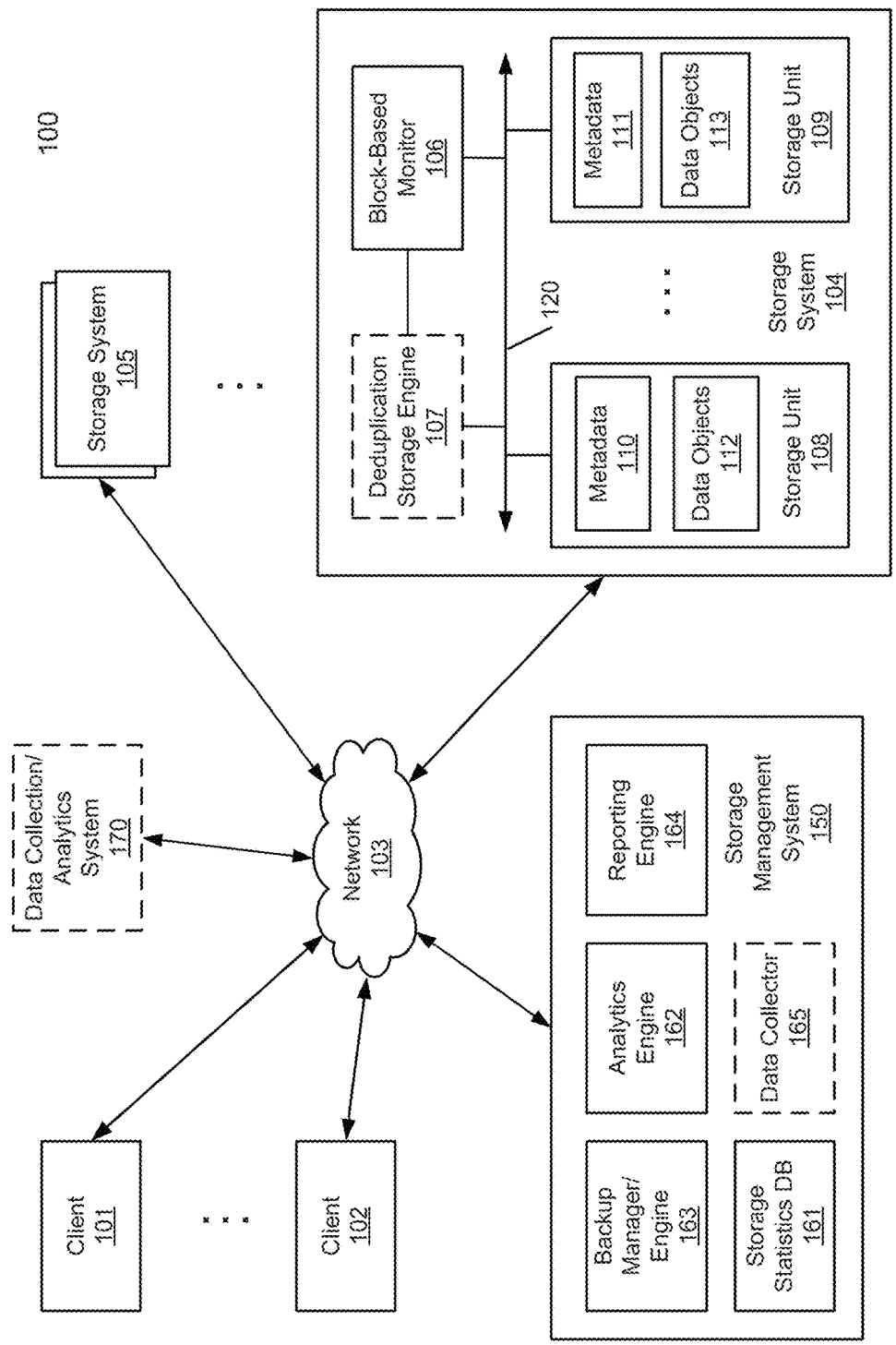
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of clients 101-102 may be a primary storage system that provides storage to other local clients, which may periodically back up the content stored therein to a backup storage system, such as storage system 104. Network 103 may be any type of networks such as a local area network (LAN), a wide area network (WAN) such as the Internet, a fiber network, a storage network, or a combination thereof, wired or wireless.

Clients 101-102 may be in physical proximity or may be physically remote from one another. Storage system 104 may be located in proximity to one, both, or neither of clients 101-102. Note that clients 101-102 may have the same or similar architectures. Similarly, storage systems 104-105 may also have the same or similar architectures. In some configurations, clients 101-102 may also be a backup storage system (e.g., source storage systems) that periodically migrate or replicate the backup data to storage systems 104-105 (e.g., target storage systems). Thus, clients 101-102 may have an architecture or configuration similar to storage system 104 as described throughout this application. For the purpose of illustration, storage system 104 will be described in details, but the description is equally applicable to other storage servers such as server 105.

Storage system 104 may include any type of server or cluster of servers (e.g., in the cloud). For example, storage system 104 may be a storage server used for any of various different purposes, such as to provide multiple users with access to shared data and/or to back up data (e.g., mission critical data). In one embodiment, storage system 104 includes, but is not limited to deduplication storage engine 107 and one or more storage units 108-109 communicatively coupled to each other. Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

In response to a data file to be stored in storage units 108-109, deduplication storage engine 107 is configured to segment the data file into multiple chunks (also referred to as segments) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, any of clients 101-102 may further include an optional deduplication engine having at least a portion of functionalities of deduplication engine 107. The deduplication engines at clients 101-102 are configured to perform local deduplication operations, respectively. For example, prior to transmit data to storage system 104, each of the deduplication engines may deduplicate the data into deduplicated segments and determine whether a particular deduplicated segment has been stored in storage system 104. A deduplicated segment is transmitted to storage system 104 only it has not been stored in storage system 104.

For example, when client 101 is about to transmit a data stream (e.g., a file or a directory of one or more files) to storage system 104, the deduplication engine (not shown) is configured to deduplicate the data stream into deduplicated segments. For each of the deduplicated segments, client 101 transmits a fingerprint of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic and the processing resources required can be greatly reduced.

In one embodiment, storage system 104 further includes a block-based monitor or monitoring logic 106 to monitor, capture statistics data of a particular data block or data blocks associated with a data object, a file, and/or other storage resources (e.g., file system, directory), etc., and store the captured statistics data in a statistics database (not shown) maintained by a persistent storage device. The stored statistics data of data blocks stored in the statistics database can be analyzed, for example, by an analysis module or profiling engine (not shown), subsequently to derive or develop a trend of data accessing patterns of the data blocks at a block level.

In one embodiment, the statistics data of data blocks may be transmitted from storage system 104 to and collected by data collector 165 of management server 150 over network 103 to be stored therein as part of statistics database 161. Similarly, block-based statistics data may also be collected from other storage systems 105. As described above, the block-based statistics data are statistics concerning a particular data block or data blocks of a storage resource. It is lower level or granularity compared to conventional statistics at a file level.

The block-based statistics data stored in storage statistics database 161 may be subsequently analyzed by analytics engine 162, for example, to derive or develop trends of accessing statistics patterns at a block level. The analytics results can be reported by a reporting module back to the requester. Alternatively, the statistics data of storage systems 104-105 may be collected by a dedicated or third-party data collection agent 170. The collected statistics data can be subsequently transmitted from data collection system 170 to management server 150.

In one embodiment, management server 150 is to manage operations of storage systems 104-105, as well as clients 101-102. For example, management server 150 may be an EMC Networker™ server. An administrator can log into management server from a client device such as a management console via an administrative interface (e.g., Web interface or command line interface or CLI). An administrator can utilize backup manager or backup engine 163 to configure and initiate a backup or replication from any of clients 101-102 to any of storage systems 104-105. From management server 150, an administrator can also provision or allocate any one or more of storage systems 104-105 to provide storage services to clients 101-102. For example, storage systems 104-105 may be members of storage servers in a cloud, which may be public cloud, private cloud, or a hybrid cloud. Storage servers 104-105 may be configured to provide storage as a service or software defined storage services, for example, as part of a software defined data center.

Figure 2:
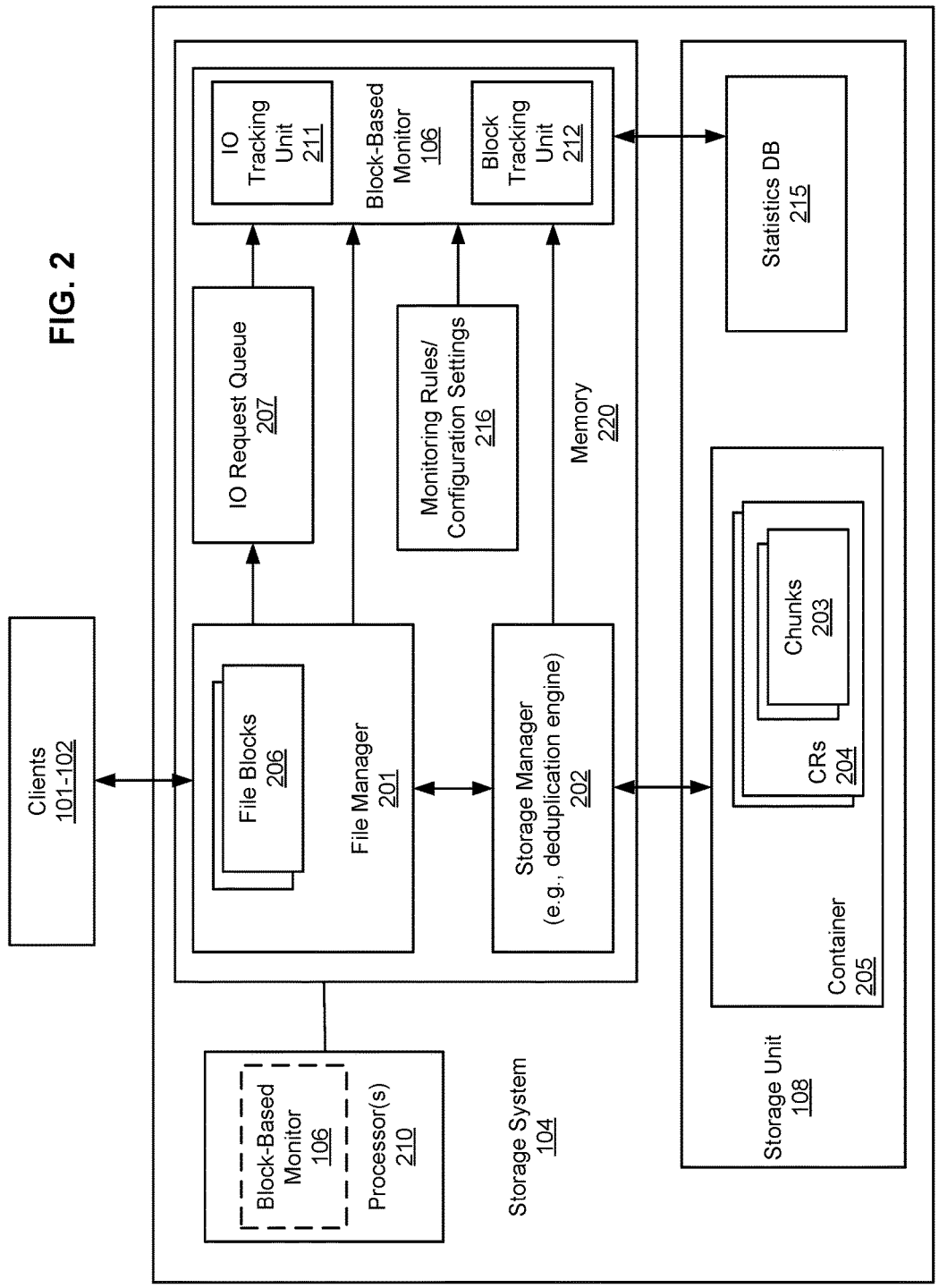
FIG. 2 is a block diagram illustrating a storage system according to one embodiment.

FIG. 2 is a block diagram illustrating a storage system according to one embodiment. The storage system illustrated in FIG. 2 is similar to the storage system in FIG. 1. Certain details have been omitted, however, in order to avoid obscuring the invention. Further, certain other details of storage system 104 have been added in FIG. 2 in order to better illustrate the invention. In one embodiment, storage system 104 includes input/output (IO) request queue 207 configured to store pending IO requests (e.g., from clients 101-102). In one embodiment, IO request queue 207 is implemented as a first-in-first-out (FIFO) buffer. In such an embodiment, IO requests in IO request queue 207 are serviced on a "first come first served" basis.

Storage system 104 further includes file manager 201, which can be executed by a processor 210 in memory 220 to provide an interface to access files stored at storage system 104. File manager 201 may be part of a file system service interface. In one embodiment, file manager 201 interfaces with storage manager 202 to access file blocks 206 from storage system 104. As used herein, a file block is a data unit of each I/O request to read/write data from/to storage system 104. In one embodiment, storage manager 202 includes a deduplication storage engine, such as deduplication storage engine 107, to segment file blocks 206 into deduplication chunks 203. In one embodiment, storage manager 202 further includes a compression storage engine to further compress deduplicated chunks 203 into compression regions or CRs 204, which are stored as part of container 205. File blocks 206, chunks 203, and CRs 204 can each have a different size.

In one embodiment, block-based monitor 106 includes IO tracking unit 211 configured to track storage statistics based on information obtained from IO request queue 207 and/or from file manager 201 and a block tracking unit 212 configured to track changed block lists associated with a variety of storage resources. In one embodiment, block tracking unit 212 is configured to monitor and capture statistics data of file blocks 206 when file blocks 206 are being accessed. In one embodiment, block-based monitor 106 may communicate with file manager, for example, via an application programming interface (API) or a plugin interface, to obtain the statistics data at a file block level. Alternatively, block tracking unit 212 of block-based monitor 106 may communicate with storage manager 202, such as deduplication engine, to obtain deduplication related statistics data associated with the deduplicated data segments (e.g., deduplicated chunks 203) referenced by file blocks 206. The captured statistics may be stored in statistics database 215 maintained in a persistent storage device 108.

According to one embodiment, the monitoring and capturing operations may be performed by block-based monitor 106 based on a set of monitoring rules or configurations 216. Monitoring rules 216 may include information identifying the storage resources (e.g., file, directory, file system) of which the associated data blocks should be monitored. Monitoring rules 216 may be configured by an administrator associated with storage system 104, for example, via a configuration interface (not shown). For example, an administrator can directly log into storage system 104 to configure monitoring rules 216. Alternatively, the administrator can log into a centralized management system (e.g., management system 150 of FIG. 1) to configure the set of rules, where the management system in turn transmit the set of rules to storage system 104 as part of rules 216. The set of monitoring rules 216 may also be stored in a persistent storage device such as storage device 108.

Figure 3:
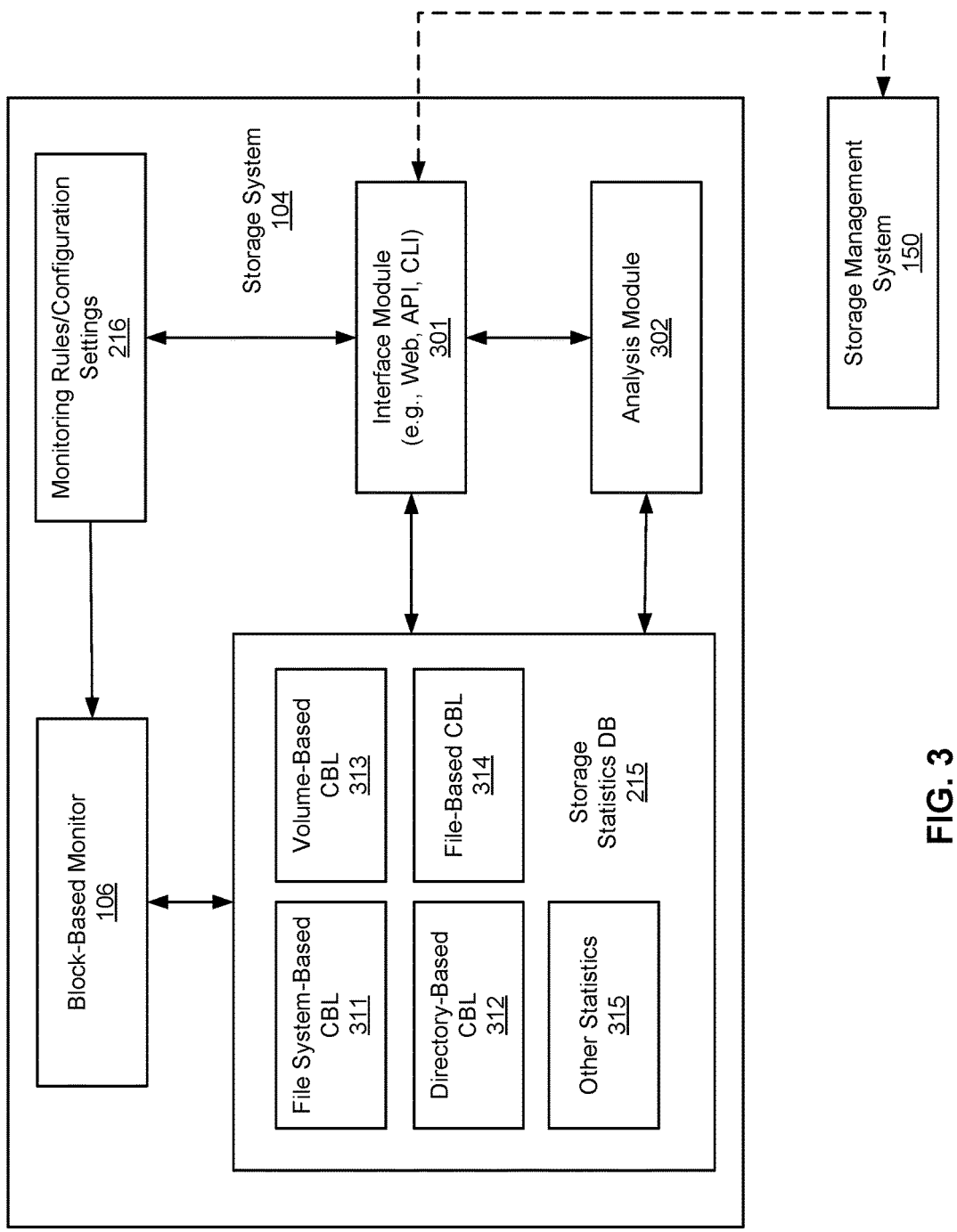
FIG. 3 is a block diagram illustrating a storage system according to another embodiment of the invention.

FIG. 3 is a block diagram illustrating a storage system according to another embodiment of the invention. Referring to FIG. 3, storage system 104 includes an interface module 301 configured to provide an interface (e.g., Web, API, CLI) to allow a client, such as management system or console 150 or other clients, to configure monitoring rules 216 and/or to access statistics information stored in statistics database 215. An administrator can instruct, via monitoring rules 216, monitoring logic 106 to monitor and capture certain information of storage resources of storage system 104.

Figure 5:
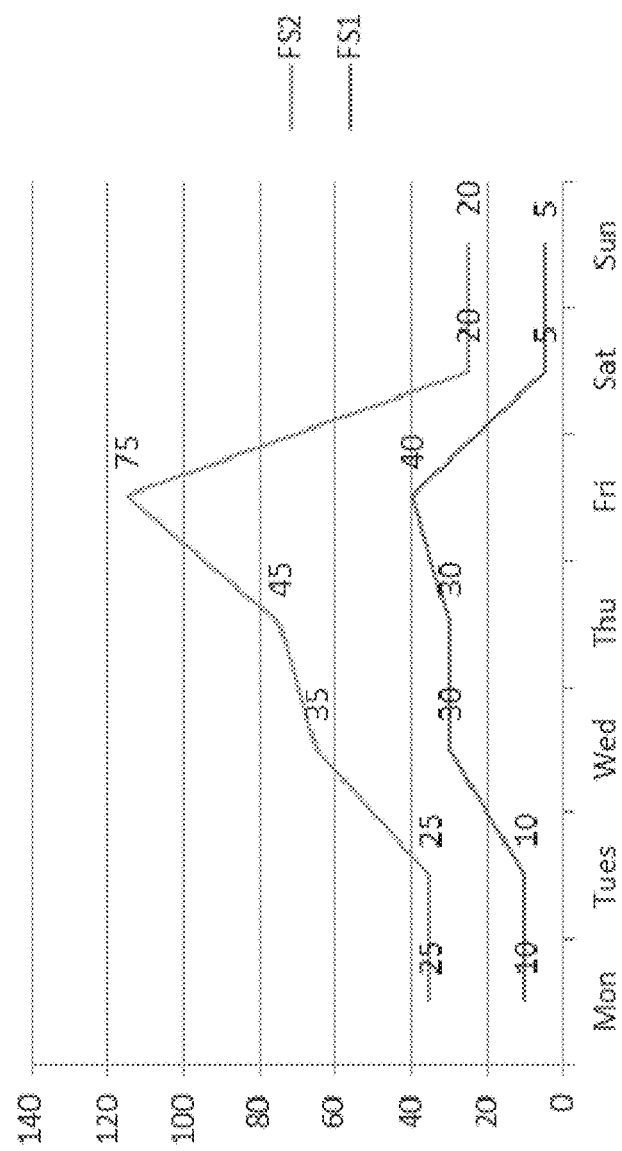
FIG. 5 is a diagram illustrating an example of analysis report according to one embodiment of the invention.

In one embodiment, in response to an IO request for accessing a data block of a storage resource (e.g., file, directory, file system), block-based monitor 106 accesses monitoring rules 216 to determine whether the storage resource should be monitored. If monitoring rules 216 indicate that the storage resource being accessed should be monitored, block-based monitor 106 monitors and captures statistics data of the data block being accessed. For example, block-based monitor 106 may determine the time of the access of the data block and capture a time stamp of the data blocking being accessed. Block-based monitor 106 may further determine the type of storage resources (e.g., file system, directory, file, volume) associated with the data block being accessed. Block-based monitor 106 may further determine a percentage of block changed within a period of time (e.g., per day, week, month, etc.) and/or the level of block-based activities (e.g., high, medium, low). Block-based monitor 106 may further determine a changed block list (CBL) of data blocks of the storage resource being accessed, as well as the percentage of the changed blocks, etc. The CBLs may include file system-based CBL 311, directory-based CBL 312, volume-based CBL 313, and file-based CBL 314, as well as other statistics 315. Some examples of statistics data are shown in FIGS. 4A-4C. The statistics data stored in statistics database 215 may be subsequently analyzed by an analysis module, which may be operating locally as part of analysis module 302 or remotely. The results of the analysis can be reported to a client, such as, for example, as shown in FIG. 5.

According to one embodiment, other types of statistics (e.g., storage performance statistics) may also be monitored and captured in addition to the block-level statistics, such as, for example, TO request service time, etc. As used herein, "TO request service time" refers to the amount of time required to service an TO request. For example, the service time of an TO request may be the amount of time between when file manager 201 receives the TO request and when file manager 201 indicates to the requestor that the TO request has been completed.

In one embodiment, TO tracking unit 211 is configured to collect storage performance statistics including TO request queue lengths (e.g., from TO request queue 106). As used herein, the "queue length" refers to how much of the queue has been utilized, representing how many TO requests are pending. For example, a longer queue length indicates that TO request queue 106 is more utilized (i.e., fuller) as compared to when TO request queue 106 has a shorter queue length. In other words, a longer queue length indicates that many TO requests are buffered in TO request queue 107.

In one embodiment, monitor 106 is configured to collect storage performance statistics including compression rates (e.g., from storage manager 202). A compression rate indicates how well file blocks 206 have been compressed into CRs 204. The effectiveness of compression depends on the compression algorithm that has been selected via the configuration. In one embodiment, storage system 104 provides multiple compression algorithms that a user can select through a user configuration. Some compression algorithms are more aggressive and provide better compression. These aggressive compression algorithms require more processing resources. Other compression algorithms, however, are less aggressive and do not compress data as well. These less aggressive compression algorithms require less processing resources.

As described above, IO requests are made at a data unit of file blocks 206, which can vary in size depending on the application which initiated the IO request. The IO requests are serviced by storing file blocks 206 (in the case of a write request) as CRs 204 in container 205, or by reading CRs 204 (in the case of a read request) from container 205 to construct file blocks 206. The size of CRs 204 may be the same or different from the size of file blocks 206. For example, each of file blocks 206 may comprise of multiple of CRs 204.

In one embodiment, monitor 106 is configured to collect storage performance statistics including block misalignment rates (e.g., from storage manager 202). As used herein, a "block misalignment rate" refers to how well each of file blocks 206 is evenly partitioned (i.e., divided) into CRs 204. A low block misalignment rate refers to each of file blocks 206 having a size such that it evenly divides into multiple of CRs 204. On the other hand, a high block misalignment rate refers to each of file blocks 206 having a size such that it does not evenly divide into multiple of CRs 204. By way of example, suppose each of file blocks 206 has a size of 100 bytes, and each of CRs 204 has a size of 10 bytes. In this example, the block misalignment rate is low because to serve an IO request, exactly 10 CRs 204 are accessed, totaling exactly 100 bytes. Thus, all accessed bytes are used, without any remainder/excess bytes. By way of further example, suppose each of file blocks 206 has a size of 100 bytes, and each of CRs 204 has a size of 18 bytes. In this example, the block misalignment rate is higher because to serve an IO request, 6 CRs 204 are accessed, totaling a size of 108 bytes. Thus, 8 remainder/excess bytes are accessed that are not used to construct requested file blocks 206.

In one embodiment, monitor 106 is configured to collect storage performance statistics including average IO throughput (e.g., from file manager 201). As used herein, an "average IO throughput" refers to the data rate through storage system 104, typically measured in bytes per second. It shall be understood that the average IO throughput can be measured in units other than bytes. In one embodiment, monitor 105 is configured to collect storage performance statistics including average IO operations per second (e.g., from file manager 201). As used herein, an "average IO operations per second" refers to the average number of IO operations (data or metadata) completed per second by storage system 104, typically expressed in units of operations per second (OPS). It shall be appreciated that the average IO operations can be measured in units of time other second.

In some instances, there can be a correlation between the "average IO throughput" and the "average IO operations per second" metrics. However, it is not always the case that these two metrics correlate with each other. By way of example, it is possible that storage system 104 may be performing mostly metadata IO operations. In such an example, the average IO throughput is low, but the average IO operations per second is high.

According to one embodiment, monitor 106 is configured to monitor the storage performance statistics continuously as they are changed. In an alternate embodiment, in order to reduce processing resources, one or more of storage performance statistics can be monitored periodically at predetermined time intervals. The predetermined time intervals may all be the same. Alternatively, the predetermined time intervals may be different depending on the nature of the storage performance statistics. For example, a storage performance statistic that changes frequently may be monitored at shorter predetermined time intervals in order to more accurately sample the statistic. On the other hand, a performance statistic that does not change frequently may be monitored at longer predetermined time intervals in order to conserve processing resources.

Figure 6:
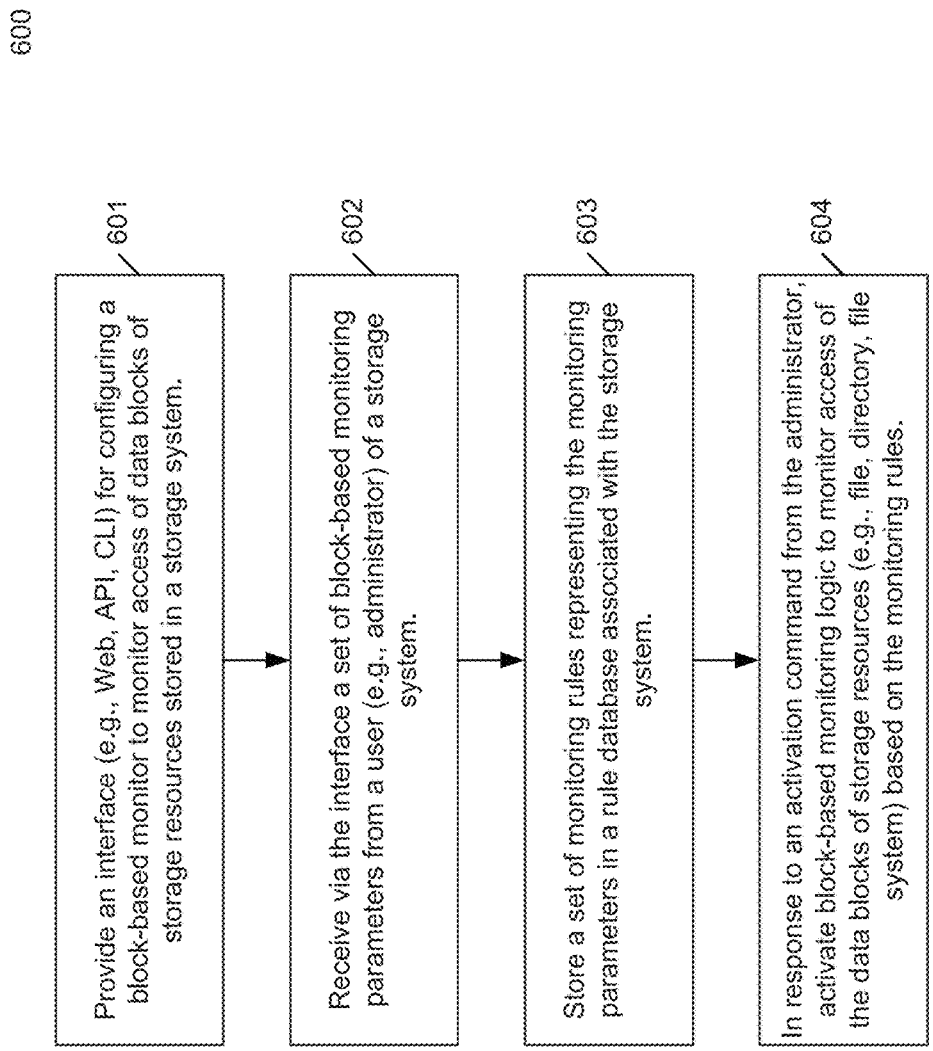
FIG. 6 is a flow diagram illustrating a process for monitoring and capturing statistics data of data blocks of a storage system according to one embodiment of the invention.

FIG. 6 is a flow diagram illustrating a process for monitoring and capturing statistics data of data blocks of a storage system according to one embodiment of the invention. Process 600 may be performed by processing logic, which may include software, hardware, or a combination thereof. For example, process 600 may be performed by storage system 104 of FIG. 1. Referring to FIG. 6, at block 601, an interface (e.g., Web, API, CLI) is provided to configure a block-based monitor to monitor access of data blocks of a storage resource (e.g., file system, directory, storage volume, file) stored in a storage system. At block 602, a set of block-based monitoring rules is received via the interface from a user (e.g., administrator) of the storage system. At block 603, the set of monitoring rules is stored in a persistent storage device, where the monitoring rules represent a set of monitoring parameters in a rule database. In response to an activation command from the user or administrator, processing logic activates the block-based monitoring logic to monitor access of the data blocks of storage resources based on the monitoring rules.

Figure 7:
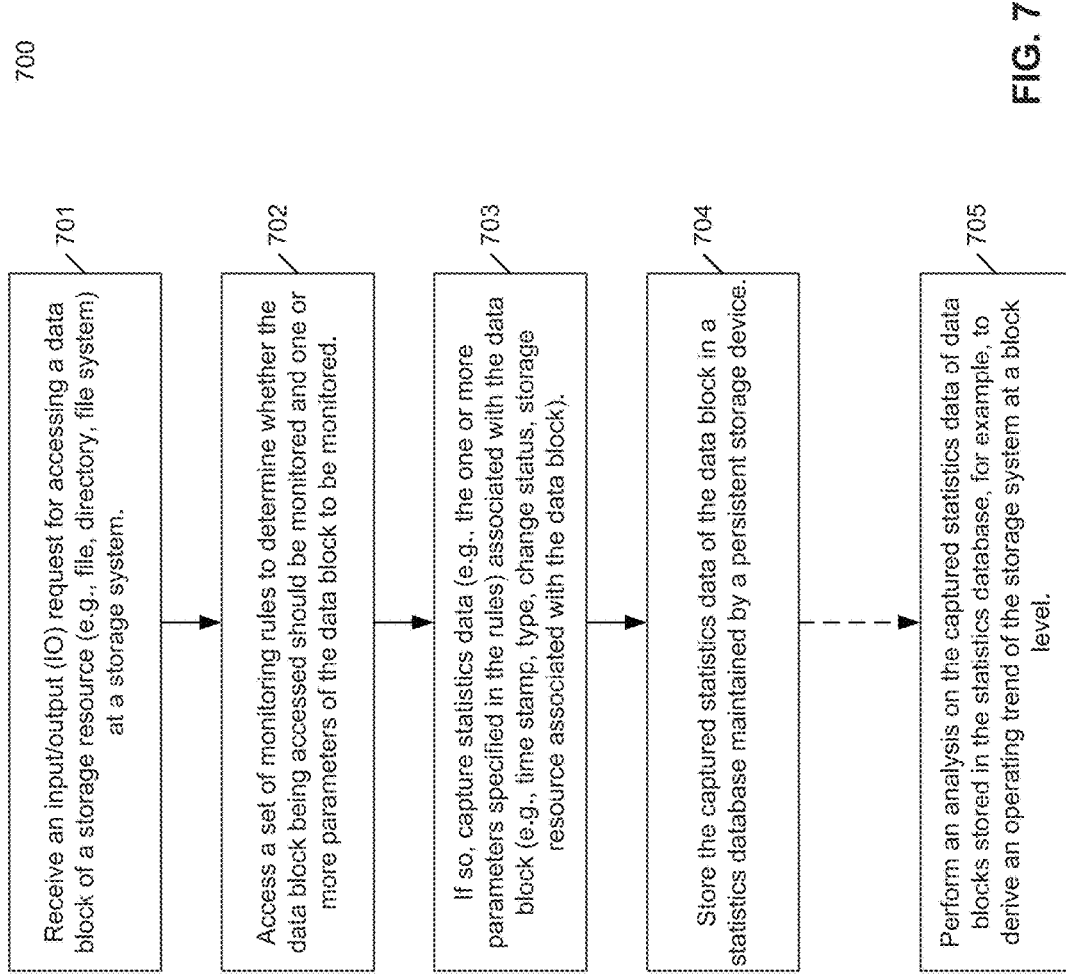
FIG. 7 is a flow diagram illustrating a process for monitoring and capturing statistics data of data blocks of a storage system according to another embodiment of the invention.

FIG. 7 is a flow diagram illustrating a process for monitoring and capturing statistics data of data blocks of a storage system according to another embodiment of the invention. Process 700 may be performed by processing logic, which may include software, hardware, or a combination thereof. For example, process 700 may be performed by storage system 104 of FIG. 1. Referring to FIG. 7, at block 701, processing logic receives an IO request for accessing a data block of a storage resource (e.g., file, file system, directory, and storage volume) at a storage system. At block 702, processing logic accesses a set of monitoring rules to determine whether the data block and/or the associated storage resource should be monitored, as well as one or more parameters that should be monitored. If so, at block 703, processing logic monitors and captures statistics data associated with the data block (e.g., time stamp, type change status, storage resource type). At block 704, the captured statistics data is stored in a statistics database. The stored statistics data may be subsequently analyzed at block 705, for example, to derive an operating trend of the storage system at a block level.

Figure 8:
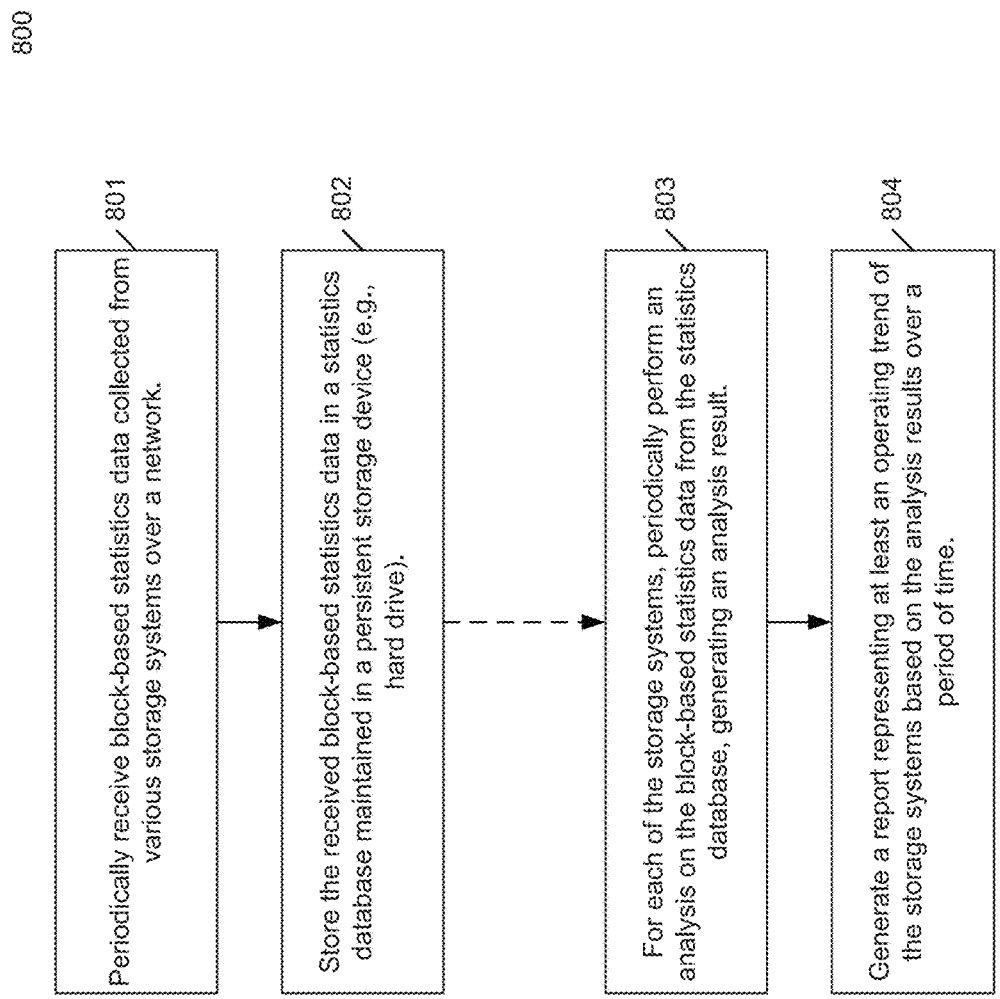
FIG. 8 is a flow diagram illustrating a process for monitoring and capturing statistics data of data blocks of a storage system according to another embodiment of the invention.

FIG. 8 is a flow diagram illustrating a process for monitoring and capturing statistics data of data blocks of a storage system according to another embodiment of the invention. Process 800 may be performed by processing logic, which may include software, hardware, or a combination thereof. For example, process 800 may be performed by system 150 of FIG. 1. Referring to FIG. 8, at block 801, processing logic periodically receives block-based statistics data collected from various storage systems (e.g., storage systems 104-105) over a network. At block 802, the received statistics data is stored in a statistics database maintained in a persistent storage device. Subsequently for each of the storage systems, at block 803, processing logic periodically performs an analysis on the block-based statistics data from the statistics database to generate an analysis result. At block 804, a report is generated based on the analysis result(s) representing at least an operating trend of the storage system(s).

Figure 9:
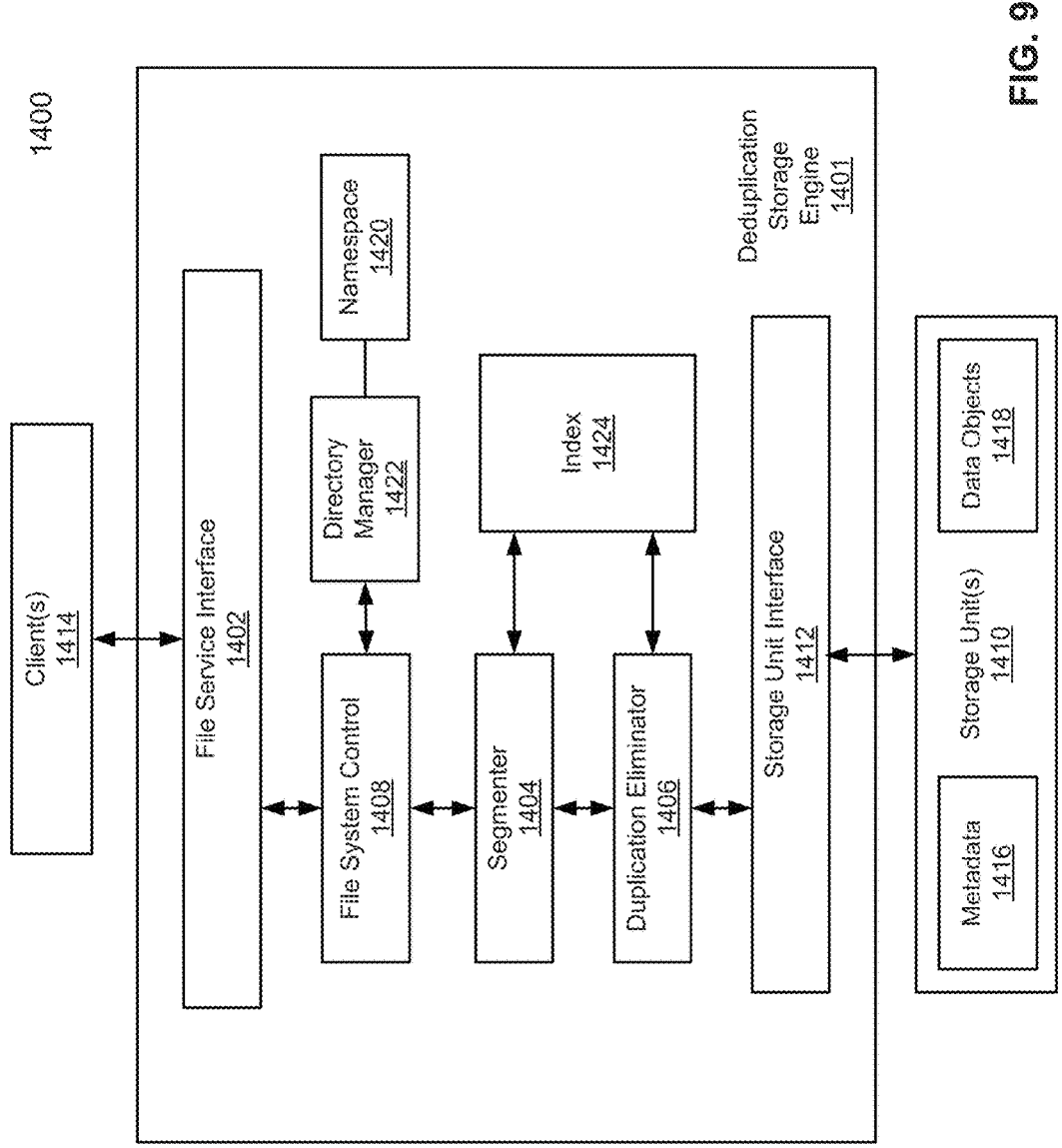
FIG. 9 is a block diagram illustrating a deduplicated storage system according to one embodiment of the invention.

FIG. 9 is a block diagram illustrating a deduplication storage system according to one embodiment of the invention. For example, deduplication storage system 1400 may be implemented as part of a deduplication storage system as described above, such as, for example, the deduplication storage system as a client and/or a server as shown in FIG. 1. In one embodiment, storage system 1400 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 1400 may have a distributed architecture, or all of its components may be integrated into a single unit. Storage system 1400 may be implemented as part of an archive and/or backup system such as a deduplicating storage system available from EMC® Corporation of Hopkinton, Mass.

In one embodiment, storage system 1400 includes a deduplication engine 1401 interfacing one or more clients 1414 with one or more storage units 1410 storing metadata 1416 and data objects 1418. Clients 1414 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1410 may be implemented locally (e.g., single node operating environment) or remotely (e.g., multi-node operating environment) via an interconnect, which may be a bus and/or a network (e.g., a storage network). In one embodiment, one of storage units 1410 operates as an active storage to receive and store external or fresh user data from a client (e.g., an end-user client or a primary storage system associated with one or more end-user clients), while the another one of storage units 1410 operates as a target storage unit to periodically archive data from the active storage unit according to an archiving policy or scheme. Storage units 1410 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1410 may also be combinations of such devices. In the case of disk storage media, the storage units 1410 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1416, may be stored in at least some of storage units 1410, such that files can be accessed independent of another storage unit. Metadata of each storage unit includes enough information to provide access to the files it contains. In one embodiment, metadata may include fingerprints contained within data objects 1418, where a data object may represent a data chunk, a compression region (CR) of one or more data chunks, or a container of one or more CRs. Fingerprints are mapped to a particular data object via metadata 1416, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 1416 may include a file name, a storage unit identifier (ID) identifying a storage unit in which the chunks associated with the file name are stored, reconstruction information for the file using the chunks, and any other appropriate metadata information. Metadata 1416 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk (also referred to as a data segment), one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1401 includes file service interface 1402, segmenter 1404 (also referred to as a chunking module or unit), duplicate eliminator 1406, file system control 1408, and storage unit interface 1412. Deduplication storage engine 1401 receives a file or files (or data item(s)) via file service interface 1402, which may be part of a file system namespace 1420 of a file system associated with the deduplication storage engine 1401. The file system namespace 1420 refers to the way files are identified and organized in the system. An example is to organize the files hierarchically into directories or folders, which may be managed by directory manager 1422. File service interface 1412 supports a variety of protocols, including a network file system (NFS), a common Internet file system (CIFS), and a virtual tape library interface (VTL), etc.

The file(s) is/are processed by segmenter 1404 and file system control 1408. Segmenter 1404, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based, such as, for example, a hash function is applied to values of data within a sliding window through the data stream or block and when the hash function is equal to a value (or equal to one of several values) then a chunk boundary is identified. In various embodiments, chunk boundaries are identified using content based functions operating on a sliding window within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, a chunk boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 1408, also referred to as a file system manager, processes information to indicate the chunk(s) association with a file. In some embodiments, a list of fingerprints is used to indicate chunk (s) associated with a file. File system control 1408 passes chunk association information (e.g., representative data such as a fingerprint) to index 1424. Index 1424 is used to locate stored chunks in storage units 1410 via storage unit interface 1412. Duplicate eliminator 1406, also referred to as a segment store, identifies whether a newly received chunk has already been stored in storage units 1410. In the event that a chunk has already been stored in storage unit(s), a reference to the previously stored chunk is stored, for example, in a chunk or segment tree associated with the file, instead of storing the newly received chunk. A chunk or segment tree of a file may include one or more nodes and each node represents or references one of the deduplicated chunks stored in storage units 1410 that make up the file. Chunks are then packed by a container manager (which may be implemented as part of storage unit interface 1412) into one or more storage containers stored in storage units 1410. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 1402 is configured to communicate with file system control 1408 to identify appropriate chunks stored in storage units 1410 via storage unit interface 1412. Storage unit interface 1412 may be implemented as part of a container manager. File system control 1408 communicates (e.g., via segmenter 1404) with index 1424 to locate appropriate chunks stored in storage units via storage unit interface 1412. Appropriate chunks are retrieved from the associated containers via the container manager and are used to construct the requested file. The file is provided via interface 1402 in response to the request. In one embodiment, file system control 1408 utilizes a tree (e.g., a chunk tree obtained from namespace 1420) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1401 may be implemented in software (e.g., executable code executed in a memory by a processor), hardware (e.g., processor(s)), or a combination thereof. For example, deduplication engine 1401 may be implemented in a form of executable instructions that can be stored in a machine-readable storage medium, where the instructions can be executed in a memory by a processor.

In one embodiment, storage system 1400 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Figure 10:
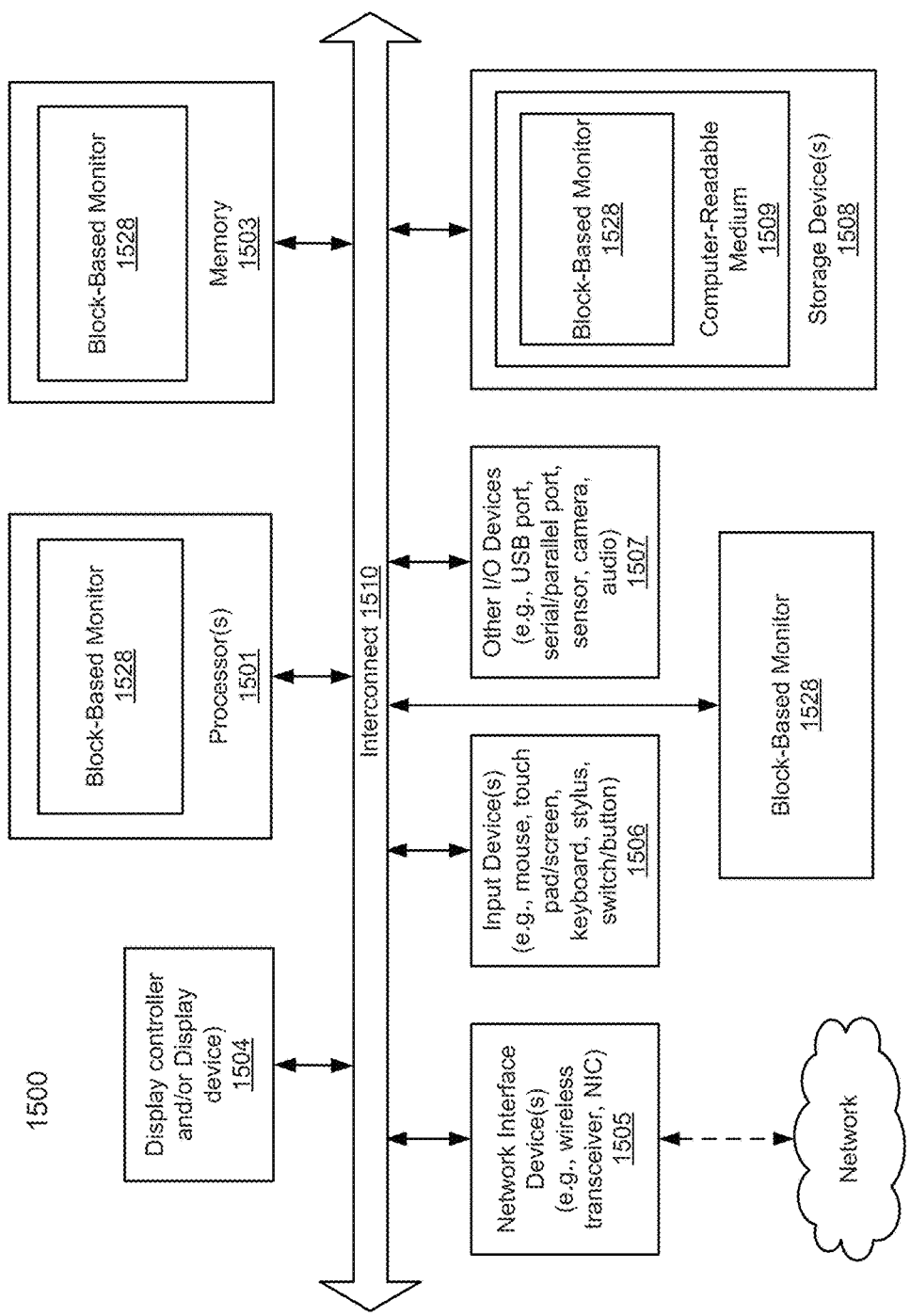
FIG. 10 is a block diagram illustrating a data processing system according to one embodiment.

FIG. 10 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra low voltage processor, may act as a main processing unit and central hub for communication with the various components of the system. Such processor can be implemented as a system on chip (SoC). Processor 1501 is configured to execute instructions for performing the operations and steps discussed herein. System 1500 further includes a graphics interface that communicates with graphics subsystem 1504, which may include a display controller, a graphics processor, and/or a display device.

Processor 1501 may communicate with memory 1503, which in an embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, input device(s) 1506, and other IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for determining characteristics of data blocks stored in a storage system, the method comprising:
    receiving an input/output (IO) request for accessing a first data block of a first file stored in a storage system, the first file being one of a plurality of files stored in the storage system, each of the files containing a plurality of data blocks;
    in response to the request, accessing, by a block-based monitor executed in a memory by a processor, a set of monitoring rules to determine whether the first file should be monitored, wherein the set of monitoring rules represents a set of monitoring parameters in a rule database;
    in response to determining that the first file should be monitored, capturing, at a data block level by the block-based monitor, statistics data associated with the first data block, including determining at least in part a time of access of the first data block, a percentage of block change within a period of time, a level of block-based activities, and a changed block list (CBL) associated with the first data block as the statistics data, and capturing a timestamp of the first data block being accessed;
    storing the statistics data of the first data block in a statistics database maintained in a persistent storage device, wherein the statistics database stores statistics data of a plurality of data blocks of a plurality of files monitored and captured based on the set of monitoring rules;
    analyzing, by an analysis module executed by the processor, the statistics data stored in the statistics database, including determining accessing patterns of data blocks of the files at the data block level, to generate an analysis result; and
    transmitting the analysis result to a remote analytics system over a network, wherein the remote analytics system analyzes analysis results of data blocks being accessed at a plurality of storage systems.

2. The method of claim 1, further comprising transmitting the statistics data of the statistics database to a remote analytics system, wherein the remote analytics system collects statistics data of data blocks being accessed in a plurality of storage systems, wherein the remote analytics system is to analyze the collected statistics data to determine accessing patterns of data blocks of the files at a data block level.

3. The method of claim 1, further comprising:
    deduplicating the first file into a plurality of data blocks using a predetermined segmenting algorithm; and
    storing the data blocks in the persistent storage device in a deduplicated manner, wherein at least one of the data blocks is referenced by a plurality of files.

4. The method of claim 1, wherein capturing statistics data associated with the first data block comprises determining a changed block list of a plurality of data blocks that have been modified from a second file, wherein the second file is a previous version of the first file.

5. The method of claim 4, wherein the second file was captured as a snapshot of files stored in the storage system at a given point of time.

6. The method of claim 4, further comprising recording the changed block list of data blocks associated with a particular file system of the storage system, which is specified as part of the set of monitoring rules.

7. The method of claim 4, further comprising recording the changed block list of data blocks associated with a particular volume of a file system of the storage system, which is specified as part of the set of monitoring rules.

8. The method of claim 4, further comprising recording the changed block list of data blocks associated with a particular directory of a file system of the storage system, which is specified as part of the set of monitoring rules.

9. A non-transitory machine-readable medium having instructions stored therein, which when executed by a processor, cause the processor to perform operations of determining characteristics of data blocks stored in a storage system, the operations comprising:
    receiving an input/output (IO) request for accessing a first data block of a first file stored in a storage system, the first file being one of a plurality of files stored in the storage system, each of the files containing a plurality of data blocks;
    in response to the request, accessing, by a block-based monitor executed in a memory by a processor, a set of monitoring rules to determine whether the first file should be monitored, wherein the set of monitoring rules represents a set of monitoring parameters in a rule database;
    in response to determining that the first file should be monitored, capturing, at a data block level by the block-based monitor, statistics data associated with the first data block, including determining at least in part a time of access of the first data block, a percentage of block change within a period of time, a level of block-based activities, and a changed block list (CBL) associated with the first data block as the statistics data, and capturing a timestamp of the first data block being accessed;
    storing the statistics data of the first data block in a statistics database maintained in a persistent storage device, wherein the statistics database stores statistics data of a plurality of data blocks of a plurality of files monitored and captured based on the set of monitoring rules;
    analyzing, by an analysis module executed by the processor, the statistics data stored in the statistics database including determining accessing patterns of data blocks of the files at the data block level, to generate an analysis result; and
    transmitting the analysis result to a remote analytics system over a network, wherein the remote analytics system analyzes analysis results of data blocks being accessed at a plurality of storage systems.

10. The non-transitory machine-readable medium of claim 9, wherein the operations further comprise transmitting the statistics data of the statistics database to a remote analytics system, wherein the remote analytics system collects statistics data of data blocks being accessed in a plurality of storage systems, wherein the remote analytics system is to analyze the collected statistics data to determine accessing patterns of data blocks of the files at a data block level.

11. The non-transitory machine-readable medium of claim 9, wherein the operations further comprise:
    deduplicating the first file into a plurality of data blocks using a predetermined segmenting algorithm; and storing the data blocks in the persistent storage device in a deduplicated manner, wherein at least one of the data blocks is referenced by a plurality of files.

12. The non-transitory machine-readable medium of claim 9, wherein capturing statistics data associated with the first data block comprises determining a changed block list of a plurality of data blocks that have been modified from a second file, wherein the second file is a previous version of the first file.

13. The non-transitory machine-readable medium of claim 12, wherein the second file was captured as a snapshot of files stored in the storage system at a given point of time.

14. The non-transitory machine-readable medium of claim 12, wherein the operations further comprise recording the changed block list of data blocks associated with a particular file system of the storage system, which is specified as part of the set of monitoring rules.

15. The non-transitory machine-readable medium of claim 12, wherein the operations further comprise recording the changed block list of data blocks associated with a particular volume of a file system of the storage system, which is specified as part of the set of monitoring rules.

16. The non-transitory machine-readable medium of claim 12, wherein the operations further comprise recording the changed block list of data blocks associated with a particular directory of a file system of the storage system, which is specified as part of the set of monitoring rules.

17. A storage system, comprising:
a processor and a memory;
a storage device storing a plurality of files, each of the files containing a plurality of data blocks; and
a block-based monitoring logic coupled to the processor and memory to
receive an input/output (IO) request for accessing a first data block of a first file stored in the storage device,
in response to the request, access a set of monitoring rules maintained in the storage device to determine whether the first file should be monitored, wherein the set of monitoring rules represents a set of monitoring parameters in a rule database,
in response to determining that the first file should be monitored, capture statistics data at a data block level associated with the first data block, wherein capturing the statistics data includes determining at least in part a time of access of the first data block, a percentage of block change within a period of time, a level of block-based activities, and a changed block list (CBL) associated with the first data block as the statistics data, and capturing a timestamp of the first data block being accessed,
store the statistics data of the first data block in a statistics database maintained in the storage device, wherein the statistics database stores statistics data of a plurality of data blocks of a plurality of files monitored and captured based on the set of monitoring rules,
analyze the statistics data stored in the statistics database, wherein analyzing the statistics data stored in the statistics database includes determining accessing patterns of data blocks of the files at the data block level, to generate an analysis result, and
transmit the analysis result to a remote analytics system over a network, wherein the remote analytics system analyzes analysis results of data blocks being accessed at a plurality of storage systems.

18. The system of claim 17, wherein the statistics data of the statistics database is transmitted to a remote analytics system, wherein the remote analytics system collects statistics data of data blocks being accessed in a plurality of storage systems, wherein the remote analytics system is to analyze the collected statistics data to determine accessing patterns of data blocks of the files at a data block level.

19. The system of claim 17, further comprising a deduplication engine to
deduplicate the first file into a plurality of data blocks using a predetermined segmenting algorithm, and
store the data blocks in the persistent storage device in a deduplicated manner, wherein at least one of the data blocks is referenced by a plurality of files.

20. The system of claim 17, wherein capturing statistics data associated with the first data block comprises determining a changed block list of a plurality of data blocks that have been modified from a second file, wherein the second file is a previous version of the first file.

21. The system of claim 20, wherein the second file was captured as a snapshot of files stored in the storage system at a given point of time.

22. The system of claim 20, wherein the block-based monitoring logic is record the changed block list of data blocks associated with a particular file system of the storage system, which is specified as part of the set of monitoring rules.

23. The system of claim 20, wherein the block-based monitoring logic is record the changed block list of data blocks associated with a particular volume of a file system of the storage system, which is specified as part of the set of monitoring rules.

24. The system of claim 20, wherein the block-based monitoring logic is record the changed block list of data blocks associated with a particular directory of a file system of the storage system, which is specified as part of the set of monitoring rules.

* * * * *